US012776487B2

(12) United States Patent
Kotani et al.

(10) Patent No.: US 12,776,487 B2
(45) **Date of Patent: *Oct. 27, 2026**

(54) ELECTRODE AND ELECTRODE MANUFACTURING METHOD

(71) Applicant: Panasonic Intellectual Property Management Co., Ltd., Kadoma (JP)

(72) Inventors: Norihiro Kotani, Osaka (JP); Reiko Izumi, Osaka (JP); Takayuki Gonjo, Osaka (JP); Hiroki Yamashita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 683 days.

This patent is subject to a terminal disclaimer.

(21) Appl. No.: 18/038,154

(22) PCT Filed: Sep. 22, 2021

(86) PCT No.: PCT/JP2021/034840
§ 371 (c)(1),
(2) Date: May 22, 2023

(87) PCT Pub. No.: WO2022/113498
PCT Pub. Date: Jun. 2, 2022

(65) Prior Publication Data

US 2023/0369569 A1 Nov. 16, 2023

(30) Foreign Application Priority Data

Nov. 30, 2020 (JP) ................................ 2020-198813

(51) Int. Cl.
*H01G 11/28* (2013.01)
*H01M 4/04* (2006.01)
(Continued)

(52) U.S. Cl.
CPC ......... *H01M 4/366* (2013.01); *H01M 4/0435* (2013.01); *H01M 4/131* (2013.01);
(Continued)

(58) Field of Classification Search
None
See application file for complete search history.

(56) References Cited

U.S. PATENT DOCUMENTS

2005/0241137 A1* 11/2005 Suzuki .................... H01M 4/70 204/290.01
2009/0104529 A1 4/2009 Nishino et al.
(Continued)

FOREIGN PATENT DOCUMENTS

CN 102629681 * 8/2012 ............... B29B 7/00
CN 102629681 A 8/2012
(Continued)

OTHER PUBLICATIONS

Office Action dated Jun. 13, 2025, issued in counterpart CN Application No. 202180078251.X, with partial English translation (8 pages).
(Continued)

*Primary Examiner* — Yoshitoshi Takeuchi
(74) *Attorney, Agent, or Firm* — WHDA, LLP

(57) ABSTRACT

This electrode includes a core material, and an electrode mixture laminated on the surface of the core material. The electrode mixture contains an active material, a conductive material, and a fibrous binding material, wherein the ratio of the density of the electrode mixture to the true density of the active material is at least 72%, and the maximum infiltration depth of the active material in the core material is at most 18% of the thickness of the core material.

10 Claims, 3 Drawing Sheets

(51) Int. Cl.

| | |
|---|---|
| ***H01M 4/131*** | (2010.01) |
| ***H01M 4/36*** | (2006.01) |
| ***H01M 4/525*** | (2010.01) |
| ***H01M 4/587*** | (2010.01) |
| *H01M 4/02* | (2006.01) |

(52) U.S. Cl.

CPC ........... *H01M 4/525* (2013.01); *H01M 4/587* (2013.01); *H01M 2004/021* (2013.01)

(56) References Cited

U.S. PATENT DOCUMENTS

| | | | | |
|---|---|---|---|---|
| 2015/0024243 | A1 | 1/2015 | Okuda et al. | |
| 2015/0086873 | A1 | 3/2015 | Hotta et al. | |
| 2016/0126557 | A1 | 5/2016 | Kataoka et al. | |
| 2017/0256367 | A1 | 9/2017 | Raman et al. | |
| 2019/0245210 | A1* | 8/2019 | Matsushita ............. | H01M 4/82 |
| 2021/0005877 | A1* | 1/2021 | Kim ...................... | H01M 4/366 |
| 2021/0249657 | A1* | 8/2021 | Shin ...................... | H01M 4/386 |

FOREIGN PATENT DOCUMENTS

| | | | | |
|---|---|---|---|---|
| CN | 111788724 | * | 10/2020 | .......... H01M 10/052 |
| JP | 2000-160118 | A | 6/2000 | |
| JP | 2003-282052 | A | 10/2003 | |
| JP | 2003-331839 | A | 11/2003 | |
| JP | 2005-340188 | A | 12/2005 | |
| JP | 2007-059387 | A | 3/2007 | |
| JP | 2007-123141 | A | 5/2007 | |
| JP | 2011-204593 | A | 10/2011 | |
| JP | 2012-94331 | A | 5/2012 | |
| JP | 2013-171791 | A | 9/2013 | |
| JP | 2015-088466 | A | 5/2015 | |
| JP | 2017-130451 | A | 7/2017 | |
| JP | 2019-512872 | A | 5/2019 | |
| WO | 2014/157010 | A1 | 10/2014 | |
| WO | 2017/138382 | A1 | 8/2017 | |
| WO | 2017/151518 | A1 | 9/2017 | |
| WO | 2019/166930 | A1 | 9/2019 | |

OTHER PUBLICATIONS

International Search Report dated Dec. 14, 2021, issued in counterpart International Application No. PCT/JP2021/034840, with English Translation. (5 pages).

Written Opinion of the International Searching Authority (Form PCT/ISA/237) dated Dec. 14, 2021, issued in counterpart International Application No. PCT/JP2021/034840. (4 pages).

Office Action dated Sep. 2, 2025, issued in counterpart JP Application No. 2022-565084. (8 pages).

Office Action dated May 20, 2025, issued in counterpart JP Application No. 2022-565084. (6 pages).

* cited by examiner

ELECTRODE AND ELECTRODE MANUFACTURING METHOD

CROSS-REFERENCE TO RELATED APPLICATIONS

This application is a National Phase Application filed under 35 U.S.C. § 371 of International Application No. PCT/JP2021/034840 filed on Sep. 22, 2021, which claims the benefit of priorities under 35 U.S.C. § 119 (a) of Japanese Patent Application No. 2020-198813 filed in Japan on Nov. 30, 2020, the contents of which are incorporated herein by reference.

TECHNICAL FIELD

The present disclosure relates to an electrode and a method for manufacturing an electrode.

BACKGROUND ART

An electrode of a non-aqueous electrolyte secondary battery such as a lithium-ion battery is typically produced by a wet method including applying an electrode mixture slurry including an active material, a binder, and the like onto a surface of a core being a metal foil, and then drying and compressing the coating film. In this case, a problem is that migration, which is travelling of the binder during drying of the coating film, easily occurs. The migration of the binder increases the amount of the binder on the surface side compared with the core side of the coating film (electrode mixture layer), leading to uneven distribution of the binder in the thickness direction of the electrode mixture layer.

A dry method is investigated in recent years including rolling and forming an electrode mixture into a sheet to produce an electrode mixture sheet and laminating the sheet onto a core to manufacture an electrode. Patent Literature 1 discloses an electrode film (electrode mixture) produced by mixing an active material, a particulate binder, and a conductive agent using a mill, and applying a large shearing force to this mixture at a high pressure for a treatment in a long time to fibrillate the binder.

CITATION LIST

Patent Literature

PATENT LITERATURE 1: National Publication of International Patent Application No. 2019-512872

SUMMARY

To improve battery characteristics, the electrode mixture is required to be densified. According to investigation by the present inventors, it has been found that increasing a linear pressure for laminating the electrode mixture sheet disclosed in PATENT LITERATURE 1 onto the core may achieve densification of the electrode mixture, but at the same time the active materials are largely embedded into the core, which decreases strength of the core. The art disclosed in PATENT LITERATURE 1 has not investigated achievement of both the densification of the electrode mixture and inhibition of the decrease in the core strength, and therefore there is still room for improvement.

An electrode according to an aspect of the present disclosure includes: a core; and an electrode mixture stacked on a surface of the core. The electrode mixture includes an active material, a conductive agent, and a fibrous binder, a proportion of a density of the electrode mixture to a true density of the active material is greater than or equal to 72%, and a maximum embedded depth of the active material into the core is less than or equal to 18% of a thickness of the core.

A method of manufacturing an electrode according to an aspect of the present disclosure is a method of manufacturing the above electrode, including: a mixing step of mixing a powder of the active material, a powder of the conductive agent, and a powder of the fibrous binder to produce electrode mixture particles having a solid content concentration of substantially 100%; a rolling step of rolling and forming the electrode mixture particles into a sheet to produce an electrode mixture sheet; a compressing step of compressing the electrode mixture sheet to produce a dense electrode mixture sheet; and a laminating step of laminating the dense electrode mixture sheet onto a core to produce the electrode.

According to an aspect of the present disclosure, both of the densification of the electrode mixture and the inhibition of the decrease in the core strength may be achieved.

DESCRIPTION OF EMBODIMENTS

Hereinafter, embodiments of an electrode and method of manufacturing an electrode according to the present disclosure will be described in detail. Embodiments described below is merely an example, and the present disclosure is not limited to the following embodiments. Drawings referred to in the description of embodiments are schematically illustrated, and a size ratio and the like of constituents illustrated in Drawings should be determined with considering the following description.

[Electrode]

Although the electrode according to the present disclosure is suitable for a non-aqueous electrolyte secondary battery such as a lithium-ion battery, it may be applied for a battery including an aqueous electrolyte or a power storage device such as a capacitor. Hereinafter, an electrode for a non-aqueous electrolyte secondary battery (particularly, a case of application for a positive electrode) will be exemplified to make a description.

Figure 1:
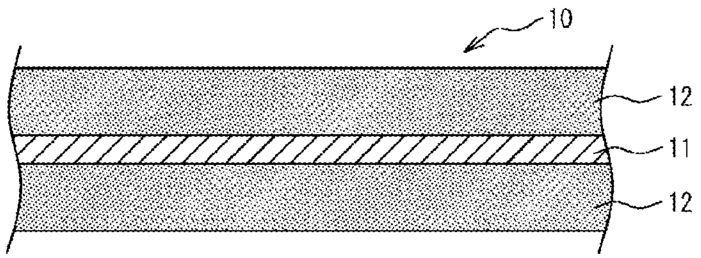
FIG. 1 is a sectional view of an electrode of an example of an embodiment.

FIG. 1 is a sectional view of an electrode of an example of an embodiment. An electrode 10 includes a core 11 and an electrode mixture 12 stacked on a surface of the core 11. As illustrated in FIG. 1, the electrode 10 may comprise the electrode mixtures 12 on both surfaces of the core 11. The electrode 10 may be an elongated electrode constituting a wound-type electrode assembly, or may be a rectangular electrode constituting a stacked-type electrode assembly. The electrode 10 may be applied for a positive electrode, a negative electrode, or both thereof of the non-aqueous electrolyte secondary battery.

For the core 11, for example, a metal foil and a film having a metal layer formed on a surface thereof, may be used. A thickness of the core 11 is, for example, greater than or equal to 5 μm and less than or equal to 20 μm. In a case of the positive electrode, a metal foil composed of aluminum as a main component may be used for the core 11. In a case of the negative electrode, a metal foil composed of copper as a main component may be used for the core 11. The main component herein means a constituent with the highest mass proportion. The core 11 may be aluminum foil made of substantially 100% aluminum, or may be copper foil made of substantially 100% copper.

The electrode mixture 12 includes an active material, a conductive agent, and a fibrous binder. The active material, the conductive agent, and the fibrous binder may have a powder state. A thickness of the electrode mixture 12 is, for example, greater than or equal to 30 μm and less than or equal to 120 μm, and preferably greater than or equal to 50 μm and less than or equal to 100 μm. Examples of the conductive agent included in the electrode mixture 12 include carbon materials such as carbon black (CB), acetylene black (AB), Ketjenblack, carbon nanotube (CNT), and graphite. A particle diameter of the conductive agent is, for example, greater than or equal to 0.01 μm and less than or equal to 0.1 μm. This particle diameter enables the conductive agent to enter and adhere to a concave part on a surface of a positive electrode active material. A content rate of the conductive agent in the electrode mixture 12 may be, for example, greater than or equal to 0.5 mass % and less than or equal to 5.0 mass %.

For the active material of the positive electrode (positive electrode active material), a lithium-transition metal composite oxide is typically used. Examples of a metal element contained in the lithium-transition metal composite oxide include Ni, Co, Mn, Al, B, Mg, Ti, V, Cr, Fe, Cu, Zn, Ga, Sr, Zr, Nb, In, Sn, Ta, and W. Among them, at least one of Ni, Co, and Mn is preferably contained. For the active material of the negative electrode (negative electrode active material), a carbon-based active material such as: a natural graphite such as flake graphite, massive graphite, and amorphous graphite; and an artificial graphite such as massive artificial graphite (MAG) and graphitized mesophase-carbon microbead (MCMB) is used. For the negative electrode active material, a Si-based active material and the like that forms an alloy with lithium may be used. The active material is a main component in the electrode mixture 12. A content rate of the active material in the electrode mixture 12 is preferably greater than or equal to 85 mass % and less than or equal to 99 mass %, and more preferably greater than or equal to 90 mass % and less than or equal to 99 mass %.

The positive electrode active material is of, for example, secondary particles formed by aggregation of a plurality of primary particles. This may provide roughness on a surface of the positive electrode active material, and enable the conductive agent to enter and adhere to a concave part of this roughness, as noted above. Particle diameters of the primary particles constituting the secondary particles are, for example, greater than or equal to 0.05 μm and less than or equal to 1 μm. The particle diameter of the primary particles is measured as a diameter of a circumscribed circle in a particle image observed with a scanning electron microscope (SEM).

An average particle diameter of the active material is, for example, within a range of greater than or equal to 1 μm and less than or equal to 40 μm. Here, the average particle diameter is a median diameter (D50) on a volumetric basis. The D50 means a particle diameter at which a cumulative frequency is 50% from a smaller particle diameter side in a particle size distribution on a volumetric basis and is also called a medium diameter. The particle size distribution of the active material may be measured by using a laser diffraction-type particle size distribution measuring device (for example, MT3000II, manufactured by MicrotracBEL Corp.) with water as a dispersion medium. When the active material is one kind, that is, the particle distribution of the active material has one peak, the average particle diameter is preferably within a range of greater than or equal to 1 μm and less than or equal to 20 μm, and more preferably within a range of greater than or equal to 5 μm and less than or equal to 15 μm.

The active material may include a first active material and a second active material. The first active material preferably has an average particle diameter within a range of greater than or equal to 3 μm and less than or equal to 7 μm. The second active material preferably has an average particle diameter within a range of greater than or equal to 10 μm and less than or equal to 34 μm. Including the first active material and the second active material, which have different average particle diameters, increases a filling rate of the active material, and may densify the electrode mixture.

A mixing ratio between the first active material and the second active material is preferably within a range of greater than or equal to 10:90 and less than or equal to 30:70 in terms of mass ratio. This may further densify the electrode mixture.

The first active material and the second active material may have the same composition. The first active material and the second active material may be the positive electrode active material, or may be an NCA-base (Ni—Co—Al-based) lithium-transition metal composite oxide. The active material may contain an active material other than the first active material and the second active material.

The fibrous binder is, for example, a fibrillated PTFE. The fibrous binder is a powder in a dry state, and not a powder in a dispersed state in a dispersion such as water. This may produce the electrode mixture in a dry process, described later. The electrode mixture 12 may include, in addition to the fibrous binder, a binder such as polyvinylidene fluoride (PVdF), which is not to be fibrillated.

A content rate of the fibrous binder in the electrode mixture 12 is, for example, greater than or equal to 0.5 mass % and less than or equal to 5.0 mass %. The fibrous binder adheres to the particle surface of the active material, and intertwines with the active material. In other words, the active material is held by the fibrous binder present as a mesh.

The fibrous binder may be produced by fibrillating a PTFE raw material (PTFE particles) belonging to a fibrillable (fiberizable) fine powder with a dry grinder such as a jet mill grinder. The PTFE raw material may be of secondary particles. A particle diameter of the PTFE raw material is, for example, greater than or equal to 100 μm and less than or equal to 700 μm, preferably greater than or equal to 100 μm and less than or equal to 500 μm, and more preferably greater than or equal to 100 μm and less than or equal to 400 μm. The particle diameter of the PTFE raw material may be determined by observing the particles of the PTFE raw material with an SEM. Specifically, outer shapes of randomly selected 100 particles are specified, then a major diameter (longest diameter) of each of the 100 particles is determined to specify an average value thereof as the particle diameter of the PTFE raw material.

A median diameter (D50) of the fibrous binder is preferably greater than or equal to 2 μm and less than or equal to 20 μm. The median diameter of the fibrous binder being greater than or equal to 2 μm and less than or equal to 20 μm means that the fibrous binder has a pulverized size relative to the PTFE particles of the PTFE raw material.

When the electrode mixture 12 is divided into three equal parts in a thickness direction and defined as a first region, a second region, and a third region from a side of the core 11, a content (a) of the fibrous binder in the first region, a content (b) of the fibrous binder in the second region, and a content (c) of the fibrous binder in the third region preferably satisfy $(c-a)/(a+b+c) \leq \pm 10\%$, and more preferably satisfy $(c-a)/(a+b+c) \leq \pm 5\%$. This allows the fibrous binder to be substantially uniformly present on an entirety of the electrode mixture 12 without uneven presence on a part of the electrode mixture 12. Using a dry process, described later, allows the fibrous binder to be substantially uniformly present on an entirety of the electrode mixture 12.

The electrode 10 may further include an adhesive layer between the core 11 and the electrode mixture 12. A thickness of the adhesive layer is, for example, greater than or equal to 1 μm and less than or equal to 10 μm. The adhesive layer having a function of adhering the core 11 and the electrode mixture 12 may improve adhesiveness between the core 11 and the electrode mixture 12. The adhesive layer may have conductivity. The adhesive layer includes, for example, a conductive agent and a binder. Examples of the conductive agent included in the adhesive layer include carbon materials such as carbon black (CB), acetylene black (AB), Ketjenblack, carbon nanotube (CNT), and graphite. The conductive agent preferably has a smaller particle diameter and a larger specific surface area. This facilitates the adhesive layer to form a structure. The specific surface area of the conductive agent is within a range of, for example, greater than or equal to 100 $m^2/g$ and less than or equal to 150 $m^2/g$. Examples of the binder included in the adhesive layer include fluororesins such as polytetrafluoroethylene (PTFE) and polyvinylidene fluoride (PVdF), polyacrylonitrile (PAN), a polyimide, an acrylic resin, and a polyolefin. The binder included in the adhesive layer is preferably PVdF. The adhesive layer may be produced by, for example: applying a slurry including the conductive agent, the binder, and the like on the surface of the core 11; and drying and then compressing the coating film. The adhesive layer may also be produced on the surface of the core 11 by a dip-coating method or a spray-coating method.

A content rate of the binder in the adhesive layer is preferably greater than or equal to 40 mass % and less than or equal to 80 mass %, more preferably greater than or equal to 45 mass % and less than or equal to 75 mass %, and particularly preferably greater than or equal to 50 mass % and less than or equal to 71 mass %. Relatively increasing the content rate of the conductive agent in the adhesive layer as above may reduce an interface resistance. If the amount of the conductive agent is too large, strength of the adhesive layer itself decreases, and due to this brittle layer structure, conductivity between the electrode mixture 12 and the core 11 is inhibited. The interface resistance of the electrode 10 is preferably less than or equal to 0.12 $\Omega cm^2$ from the viewpoint of improvement of battery characteristics. The interface resistance may be measured by using, for example, an electrode resistance measuring device (device name: XF057) manufactured by HIOKI E.E. CORPORATION.

Figure 2:
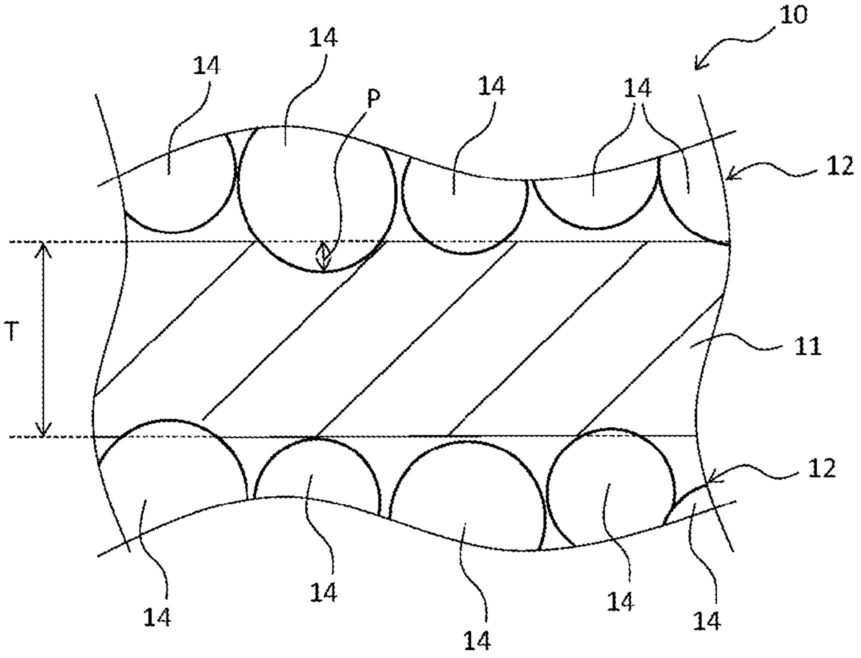
FIG. 2 is a schematic view illustrating an active material and enlarging a proximity of a core in the cross section in FIG. 1.

Next, a state of a proximity of the core 11 will be described with reference to FIG. 2. FIG. 2 illustrates the active material 14 and schematically illustrates the proximity of the core 11. As illustrated in FIG. 2, a part of the active material 14 is embedded into the core 11. Embedding the active material 14 into the core 11 may improve the adhesiveness between the electrode mixture 12 and the core 11.

A maximum embedded percentage (P/T) defined as a proportion of a maximum embedded depth P of the active material 14 into the core 11 to the thickness T of the core 11 is less than or equal to 18%. P/T is preferably less than or equal to 15%, more preferably less than or equal to 10%, and particularly preferably less than or equal to 8%. This may improve the adhesiveness between the electrode mixture 12 and the core 11 with keeping the strength of the core 11. P/T is preferably greater than or equal to 1%, more preferably greater than or equal to 3%, and particularly preferably greater than or equal to 5%.

The maximum embedded depth P is determined by observing a cross section of the electrode 10 with an SEM, as illustrated in FIG. 2. More specifically, the cross section of the electrode 10 is magnified 1500 times with the SEM. When five or more of the active materials 14 embedded into the core 11 may be observed, maximum embedded depths are determined on any five active materials 14 to specify an average value thereof as the maximum embedded depth P. When the number of the active materials 14 embedded into the core 11 is less than five with magnifying the cross section of the electrode 10 with 1500 times with the SEM, maximum embedded depths are determined on each of the active materials 14 to specify an average value thereof as the maximum embedded depth P. In the example of FIG. 2, four active materials 14 are embedded into the core 11. Thus, maximum embedded depths are determined on each of the embedded active materials 14 to specify an average value thereof as P.

A proportion of a density Dm of the active material 14 in the electrode mixture 12 to a true density Dt of the active material 14 (Dm/Dt) is greater than or equal to 72%. Dm/Dt is preferably greater than or equal to 74%. It may be mentioned that Dm/Dt of greater than or equal to 72% indicates a state of a high filling rate of the active material in a predetermined mixture volume. The density Dm of the active material 14 in the electrode mixture 12 may be calculated by multiplying an electrode mixture density by a mass proportion of the active material 14 in the electrode mixture. The electrode mixture density is calculated by dividing a mass of the electrode mixture 12 by a volume of the electrode mixture 12.

[Method of Manufacturing Electrode]

Hereinafter, the method of manufacturing the electrode 10 will be described in more detail. Although a method of manufacturing the positive electrode will be exemplified hereinafter, this manufacturing method may be similarly applied for manufacturing the negative electrode. In the case of the negative electrode, a negative electrode active material is used instead of the positive electrode active material.

Figures 3A, 3B:
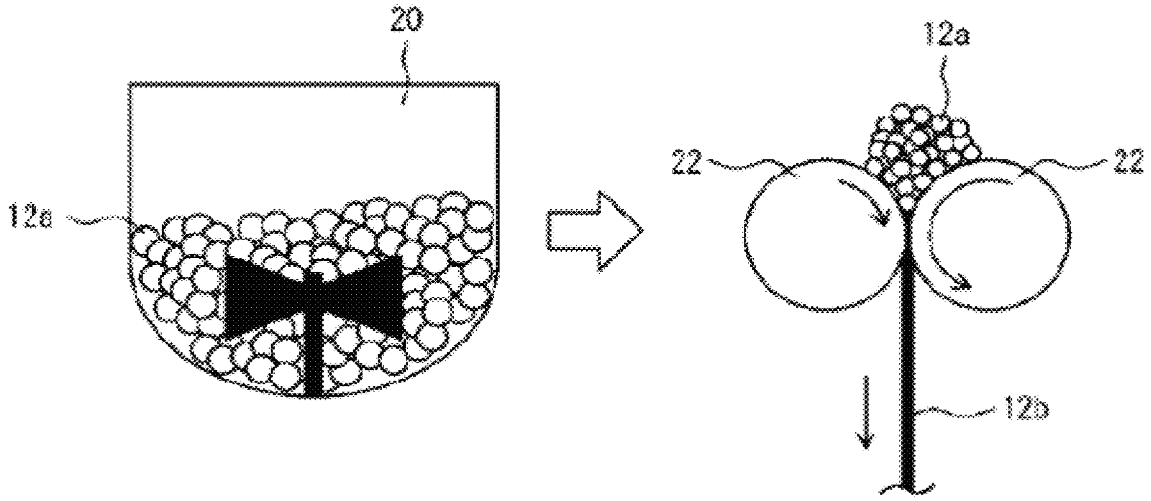
FIG. 3 (*a*) is a view illustrating a mixing step, and FIG. 3 (*b*) is a view illustrating a rolling step, in a process of manufacturing an electrode of an example of an embodiment.
Figure 4:
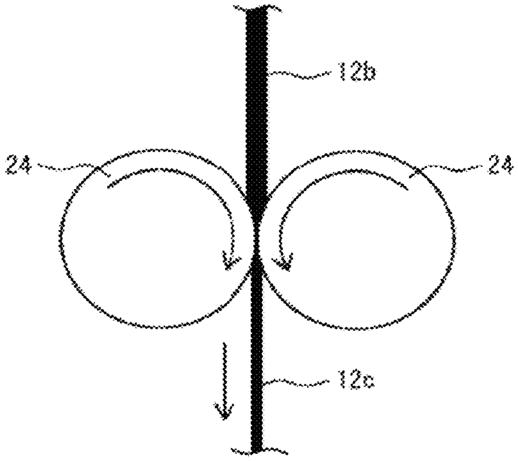
FIG. 4 is a view illustrating a compressing step in a process of manufacturing an electrode of an example of an embodiment.
Figure 5:
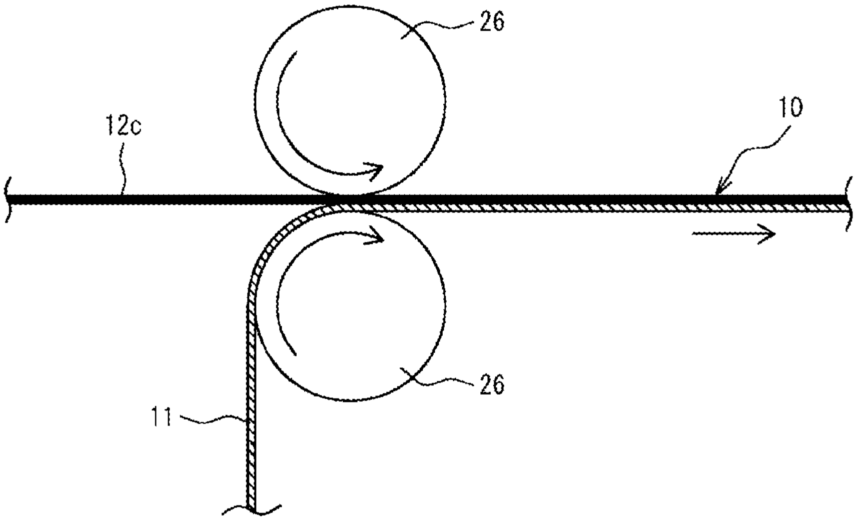
FIG. 5 is a view illustrating a laminating step in a process of manufacturing an electrode of an example of an embodiment.

FIG. 3 (*a*), FIG. 3 (*b*), FIG. 4, and FIG. 5 are views schematically illustrating a manufacturing process of the electrode 10, which is an example of an embodiment. The method of manufacturing the electrode 10 includes a mixing step illustrated in FIG. 3 (*a*), a rolling step illustrated in FIG. 3 (*b*), a compressing step illustrated in FIG. 4, and a laminating step illustrated in FIG. 5. In the mixing step, the active material and the fibrous binder are mixed to produce electrode mixture particles **12*a* having a solid content concentration of substantially 100%. In the rolling step, the electrode mixture particles 12***a* are rolled and formed into a sheet to produce an electrode mixture sheet 12*b*. In the compressing step, the electrode mixture sheet 12*b* is compressed to produce a dense electrode mixture sheet 12*c*. In the laminating step, the dense electrode mixture sheet 12*c* is laminated onto the core 11 to produce the electrode.

The method of manufacturing the electrode 10 is a dry process of manufacturing the electrode 10 by using the electrode mixture 12 having a solid content concentration of substantially 100%. The dry process is referred to a process of mixing the active material particles and the binder particles without a solvent, that is, the active material and the binder are mixed in a state of a solid content concentration being substantially 100%. The method of manufacturing the electrode 10 according to the present disclosure need not use a solvent like a conventional method of manufacturing the electrode 10. Use of a solvent being unnecessary intends to not only eliminate the solvent as a mere raw material but also eliminate a step of drying the solvent, which may eliminate ventilation equipment and the like involved with the drying step.

In the mixing step, raw materials such as the active material, the fibrous binder, and a conductive agent are mixed with a mixer 20 to produce the electrode mixture particles 12*a*. As the mixer 20, a conventionally known mechanical stirring mixer may be used, for example. Specific examples of a preferable mixer 20 include a cutter mill, a pin mill, a bead mill, a fine-particle composer (an apparatus generating a shearing force between: a rotor having a special shape and rotating at a high speed in a tank; and a collision plate), a granulator, and a kneader such as a twin-screw extrusion kneader and a planetary mixer. These mixers can apply a mechanical shearing force. A cutter mill, a fine-particle composer, a granulator, and a twin-screw extrusion kneader are preferable. This may mix the raw materials and may further fibrillate the fibrous binder. A treatment time of the mixing step (time for applying a shearing force to the materials) is preferably within a few minutes, and for example, greater than or equal to 0.5 minutes and less than or equal to 10 minutes. A too long treatment time increases an amount of the conductive agent incorporated into the fibrous binder. In this case, the battery characteristics are adversely affected such that conductivity of the electrode mixture sheet considerably decreases to rise the resistance.

The mixing step may include: a step of mixing the active material and the conductive agent to produce a coated active material; and a step of mixing the coated active material and the fibrous binder. Using the coated active material produced by mixing the active material and the conductive agent may shorten a time of mixing the coated active material and the fibrous binder. This may reduce an amount of the conductive agent incorporated into the fibrous binder. There is preferably roughness on a surface of the coated active material, and the conductive agent preferably enters and adheres to a concave part of this roughness. This enables the conductive agent on the surface of the coated active material to be hardly removed by the fibrous binder during the step of mixing the coated active material and the fibrous binder.

As a method of dry-mixing the active material and the conductive agent, a mechano-fusion method may be used, for example. The mechano-fusion method is a dry-treatment method performed with a mechano-fusion reactor comprising a compressor inside thereof and having a tubular chamber rotating at a high speed. The conductive agent and the active material are fed into the chamber, and the chamber rotates to allow the particles to be pressed with each other and with a wall of the chamber. Using the compressor and generating a centrifugal force with the high-speed rotation enhance the adhering and bonding between the conductive agent and the active material. Examples of the mechano-fusion reactor include: "Nobilta" ® crusher or "MECHANO FUSION" ® crusher, manufactured by HOSOKAWA MICRON CORPORATION (Japan); "Hybridizer" ™ crusher, manufactured by NARA MACHINERY CO., LTD.; "BALANCE GRAN", manufactured by FREUND-TURBO CORPORATION; and "COMPOSI", manufactured by NIPPON COKE & ENGINEERING CO., LTD.

Next, in the rolling step, as illustrated in FIG. 3 (*b*), the electrode mixture particles 12*a* are rolled and formed into a sheet using two rollers 22. The two rollers 22 are disposed with a predetermined gap, and rotate in the same direction. The electrode mixture particles 12*a* are fed into the gap between the two rollers 22 to be compressed with the two rollers 22, and to be stretched into a sheet. The two rollers 22 have, for example, the same roller diameter. The obtained electrode mixture sheet 12*b* may be passed through the gap between the two rollers 22 a plurality of times, or may be stretched by using another roller having a different roll diameter, peripheral speed, gap, and the like one or more times. The roller may be heated to heat-press the electrode mixture particles 12*a*.

A thickness of the electrode mixture sheet 12*b* may be regulated with, for example, the gap between the two rollers 22, the peripheral speed, the number of times of the stretching treatment, and the like. In the rolling step, the electrode mixture particles 12*a* are preferably formed into a sheet using two rollers 22 having peripheral speed ratio differing by a factor of two or more. Setting the peripheral speed ratios of the two rollers 22 to be different facilitates the thinning of the electrode mixture sheet 12*b* to improve the productivity, for example.

Next, in the compressing step, as illustrated in FIG. 4, the electrode mixture sheet 12*b* is compressed by using two rollers 24 to produce the dense electrode mixture sheet 12*c*. The two rollers 24 have the same roller diameter, are disposed with a predetermined gap, and rotate in the same direction at the same peripheral speed, for example. To the two rollers 24, a linear pressure of, for example, greater than or equal to 1 t/cm and less than or equal to 5 t/cm may be applied. When one kind of the active material is used, compression with a relatively high linear pressure of, for example, greater than or equal to 3 t/cm and less than or equal to 5 t/cm may regulate Dm/Dt to be greater than or equal to 72%. When the active material includes the first active material and the second active material, compression with even a relatively low linear pressure of, for example, greater than or equal to 1 t/cm and less than or equal to 3 t/cm may regulate Dm/Dt to be greater than or equal to 72%. A temperature of the two roller 24 is not particularly limited, and may be, for example, a room temperature. A density of the active material in the dense electrode mixture sheet 12*c* is, for example, greater than or equal to 3.6 g/cm$^3$ and less than or equal to 4.0 g/cm$^3$.

Next, in the laminating step, as illustrated in FIG. 5, the dense electrode mixture sheet 12*c* is laminated onto the core 11 to obtain the electrode 10 in which the mixture layer composed of the electrode mixture 12 is provided on the surface of the core 11. Although FIG. 5 illustrates a state of the electrode mixture 12 bonded onto only one surface of the core 11, the electrode mixture 12 is preferably bonded onto both surfaces of the core 11. The two electrode mixtures 12 may be simultaneously bonded onto both the surfaces of the core 11. Alternatively, one electrode mixture 12 may be bonded onto one surface of the core 11, and then the other electrode mixture 12 may be bonded onto the other surface.

In the laminating step, the dense electrode mixture sheet 12*c* is laminated onto the surface of the core 11 by using two roller 26. The two rollers 26 have the same roller diameter, are disposed with a predetermined gap, and rotate in the same direction at the same peripheral speed, for example. A temperature of the two roller 26 is, for example, greater than or equal to 50° C. and less than or equal to 300° C. A linear pressure applied by the two rollers 26 is preferably greater than or equal to 0.1 t/cm and less than or equal to 2 t/cm, and more preferably greater than or equal to 0.2 t/cm and less than or equal to 1 t/cm.

EXAMPLES

Hereinafter, the present disclosure will be further described with Examples, but the present disclosure is not limited to these Examples.

Example 1

[Production of Positive Electrode Mixture Particles (Mixing Step)]

Used as a first active material was an NCA-based (Ni—Co—Al-based) lithium-transition metal composite oxide having an average particle diameter (D50) of 6.5 μm. By using NOB300 Nobilta®, manufactured by HOSOKAWA MICRON CORPORATION, 1000 g of the lithium-transition metal composite oxide and 10 g of carbon black (CB) were mixed for 5 minutes to produce a carbon-coated first active material. Used as a second active material was a lithium-transition metal composite oxide having an average particle diameter (D50) of 21 μm and the same composition as the first active material. In the same manner as of the first active material, a carbon-coated second active material was produced.

Then, the carbon-coated first active material and the carbon-coated second active material were mixed at a ratio of 20:80 in terms of mass ratio to produce a carbon-coated positive electrode active material. This carbon-coated positive electrode active material and a fibrous binder were fed into a mixer (Wonder Crusher, manufactured by OSAKA CHEMICAL Co., Ltd.) in terms of mass ratio of 101:4, and the mixture was subjected to a mixing treatment at a room temperature at the number of rotation of Memory 5 for 5 minutes. The number of rotation of Wonder Crusher is maximum 28000 rpm at Memory 10. This mixing treatment yielded positive electrode mixture particles in which the carbon-coated positive electrode active material and the fibrous binder were uniformly dispersed. The obtained positive electrode mixture had a solid content concentration of 100%.

[Production of Positive Electrode Mixture Sheet (Rolling Step)]

The obtained positive electrode mixture particles were passed through a gap between two rollers, and rolled to produce a positive electrode mixture sheet. A peripheral speed ratio of the two rollers was set to 1:3 to regulate a thickness of the positive electrode mixture sheet to greater than or equal to 100 μm and less than or equal to 120 μm.

[Production of Dense Positive Electrode Mixture Sheet (Compressing Step)]

The obtained positive electrode mixture sheet was passed through a gap between two rollers at a room temperature, and compressed (linear pressure: 2.0 t/cm) to produce a dense positive electrode mixture sheet.

[Production of Positive Electrode (Laminating Step)]

The dense positive electrode mixture sheet was disposed on a front face and back face of a core with 14.4 μm in thickness, and a stacked body of the dense positive electrode mixture sheet and the core was pressed (linear pressure: 0.2 t/cm) by using two rollers heated to 200° C. to obtain a positive electrode. A thickness including the core and the positive electrode mixture sheets disposed on both the surfaces of the core was regulated within greater than or equal to 170 μm and less than or equal to 180 μm.

[Evaluation of Maximum Embedded Percentage (P/T)]

A maximum embedded percentage (P/T) was calculated by the aforementioned method.

[Evaluation of Dm/Dt]

A proportion of a density Dm of the active material in the positive electrode mixture to a true density Dt of the positive electrode active material (Dm/Dt) was calculated by the aforementioned method.

Example 2

A positive electrode was produced and evaluated in the same manner as in Example 1 except that, in the mixing step, an NCA-based lithium-transition metal composite oxide having an average particle diameter (D50) of 14.2 μm was used as the second active material. Note that, a composition of the second active material in Example 2 was the same as the composition of the second active material in Example 1.

Example 3

A positive electrode was produced and evaluated in the same manner as in Example 1 except that, in the mixing step, the mixing ratio between the carbon-coated first active material and the carbon-coated second active material was changed to 30:70 in terms of mass ratio.

Example 4

A positive electrode was produced and evaluated in the same manner as in Example 1 except that, in the mixing step, the mixing ratio between the carbon-coated first active material and the carbon-coated second active material was changed to 10:90 in terms of mass ratio.

Example 5

A positive electrode was produced and evaluated in the same manner as in Example 1 except that, in the laminating step, the linear pressure for pressing the stacked body of the dense positive electrode mixture sheet and the core was changed to 1.0 t/cm.

Example 6

A positive electrode was produced and evaluated in the same manner as in Example 1 except that: in the mixing step, only one kind of the active material of an NCA-based lithium-transition metal composite oxide having a D50 of 11 μm was used to produce a carbon-coated positive electrode active material; and in the compressing step, the linear pressure for compressing the positive electrode mixture sheet was changed to 4.4 t/cm. Note that, a composition of the active material in Example 6 was the same as the composition of the active material in Example 1.

Comparative Example 1

A positive electrode was produced and evaluated in the same manner as in Example 1 except that: in the mixing step, only one kind of the active material of an NCA-based lithium-transition metal composite oxide having a D50 of 11 μm was used to produce a carbon-coated positive electrode active material; no compressing step was performed; and in the laminating step, the positive electrode mixture sheet was laminated onto the core at a linear pressure of 2.0 t/cm. Note that, a composition of the active material in Comparative Example 1 was the same as the composition of the active material in Example 1.

Comparative Example 2

A positive electrode was produced and evaluated in the same manner as in Example 1 except that: no compressing step was performed; and in the laminating step, the positive electrode mixture sheet was laminated onto the core at a linear pressure of 2.0 t/cm.

Table 1 shows the evaluation results (P/T and Dm/Dt) of Examples and Comparative Examples. Table 1 also shows: the average particle diameters (D50) of the first active material and second active material; the mixing ratio between the first active material and the second active material; the roller temperature and linear pressure in the compressing step; a roller temperature and linear pressure in the laminating step; and (c−a)/(a+b+c).

TABLE 1

| | Average particle diameter [μm] | | Mixing ratio (first: | (Compressing step) Roller temperature-Linear | (Laminating step) Roller temperature-Linear | (c − a)/ (a + | | |
|---|---|---|---|---|---|---|---|---|
| | First | Second | second) | pressure | pressure | b + c) | P/T | Dm/Dt |
| Example 1 | 6.5 | 21 | 2:8 | RT-2.0 t/cm | RT-0.2 t/cm | 1% | 5.6% | 78.0% |
| Example 2 | 6.5 | 14.2 | 2:8 | RT-2.0 t/cm | RT-0.2 t/cm | 1% | 5.6% | 76.1% |
| Example 3 | 6.5 | 21 | 3:7 | RT-2.0 t/cm | RT-2.0 t/cm | 1% | 5.6% | 77.9% |
| Example 4 | 6.5 | 21 | 1:9 | RT-2.0 t/cm | RT-0.2 t/cm | 1% | 5.6% | 74.9% |
| Example 5 | 6.5 | 21 | 2:8 | RT-2.0 t/cm | RT-1.0 t/cm | 1% | 7.2% | 78.0% |
| Example 6 | 11(one kind) | | — | RT-4.4 t/cm | RT-2.0 t/cm | 1% | 5.6% | 78.0% |
| Comparative Example 1 | 11(one kind) | | — | — | RT-2.0 t/cm | 1% | 19.6% | 73.7% |
| Comparative Example 2 | 6.5 | 21 | 2:8 | — | RT-2.0 t/cm | 1% | 30.9% | 78.0% |

As shown in Table 1, the positive electrodes of Examples may inhibit decrease in strength of the core with densifying the positive electrode mixture. Meanwhile, in the positive electrodes of Comparative Examples, which performs no compressing step, the linear pressure in the laminating step is needed to be increased in order to densify the positive electrode mixture, resulting in increase in P/T and failure to achieve the strength of the core.

REFERENCE SIGNS LIST

10 Electrode
11 Core
12 Electrode mixture
12*a* Electrode mixture particle
12*b* Electrode mixture sheet
12*c* Dense electrode mixture sheet
14 Active material
20 Mixer
22, 24, 26 Roller

The invention claimed is:

1. An electrode, including:

a core; and an electrode mixture stacked on a surface of the core, wherein the electrode mixture includes an active material, a conductive agent, and a fibrous binder, a proportion of a density of the active material in the electrode mixture to a true density of the active material is greater than or equal to 72%, a maximum embedded depth of the active material into the core is greater than or equal to 1% and less than or equal to 18% of a thickness of the core, the active material includes a first active material and a second active material, the first active material has an average particle diameter within a range of greater than or equal to 3 μm and less than or equal to 7 μm, the second active material has an average particle diameter within a range of greater than or equal to 10 μm and less than or equal to 34 μm, and the first active material and the second active material have the same composition.

2. The electrode according to claim 1, wherein a mixing ratio between the first active material and the second active material is within a range of greater than or equal to 10:90 and less than or equal to 30:70 in terms of mass ratio.

3. The electrode according to claim 1, wherein when the electrode mixture is divided into three equal parts in a thickness direction and defined as a first region, a second region, and a third region from a side of the core, a content (a) of the fibrous binder in the first region, a content (b) of the fibrous binder in the second region, and a content (c) of the fibrous binder in the third region satisfy (c−a)/(a+b+c) ≤+10%.

4. The electrode according to claim 1, further including an adhesive layer between the core and the electrode mixture, the adhesive layer containing a binder and a conductive agent, wherein a content rate of the conductive agent in the adhesive layer is greater than or equal to 40 mass % and less than or equal to 80 mass %.

5. An electrode, including:

a core; and an electrode mixture stacked on a surface of the core, wherein the electrode mixture includes an active material, a conductive agent, and a fibrous binder, a proportion of a density of the active material in the electrode mixture to a true density of the active material is greater than or equal to 72%, a maximum embedded depth of the active material into the core is greater than or equal to 1% and less than or equal to 18% of a thickness of the core, and when the electrode mixture is divided into three equal parts in a thickness direction and defined as a first region, a second region, and a third region from a side of the core, a content (a) of the fibrous binder in the first region, a content (b) of the fibrous binder in the second region, and a content (c) of the fibrous binder in the third region satisfy $(c-a)/(a+b+c) \leq \pm 10\%$.

6. The electrode according to claim 5, wherein the active material includes a first active material and a second active material, the first active material has an average particle diameter within a range of greater than or equal to 3 μm and less than or equal to 7 μm, and the second active material has an average particle diameter within a range of greater than or equal to 10 μm and less than or equal to 34 μm.

7. The electrode according to claim 6, wherein a mixing ratio between the first active material and the second active material is within a range of greater than or equal to 10:90 and less than or equal to 30:70 in terms of mass ratio.

8. The electrode according to claim 5, further including an adhesive layer between the core and the electrode mixture, the adhesive layer containing a binder and a conductive agent, wherein a content rate of the conductive agent in the adhesive layer is greater than or equal to 40 mass % and less than or equal to 80 mass %.

9. A method of manufacturing the electrode according to claim 1, including:

a mixing step of mixing a powder of the active material, a powder of the conductive agent, and a powder of the fibrous binder to produce electrode mixture particles having a solid content concentration of substantially 100%;

a rolling step of rolling and forming the electrode mixture particles into a sheet to produce an electrode mixture sheet;

a compressing step of compressing the electrode mixture sheet to produce a dense electrode mixture sheet; and a laminating step of laminating the dense electrode mixture sheet onto the core to produce the electrode.

10. The method of manufacturing the electrode according to claim 9, wherein the mixing step includes:

a step of mixing the active material and the conductive agent to produce a coated active material; and a step of mixing the coated active material and the fibrous binder.

* * * * *